United States Patent [19]

Nordin et al.

[11] Patent Number: 4,946,175
[45] Date of Patent: Aug. 7, 1990

[54] SEALING RING FOR A PIPE JOINT

[75] Inventors: Olof Nordin, Värnamo; Uno Andersson, Forsheda, both of Sweden

[73] Assignee: Forsheda AB, Forsheda, Sweden

[21] Appl. No.: 193,871

[22] Filed: May 13, 1988

[30] Foreign Application Priority Data

May 27, 1987 [SE] Sweden ............................ 8702237

[51] Int. Cl.$^5$ .................. F16J 15/02; F16J 15/10; F16L 21/02
[52] U.S. Cl. .................. 277/207 A; 277/208; 277/DIG. 10; 285/110; 285/230; 285/231
[58] Field of Search ................ 277/1, 34, 34.3, 34.6, 277/152, 153, 165, 168–172, 186, 205, 190, 206 R, 207 R, 207 A, 207 B, 226, 208–210, 215; 251/214, 306; 285/94, 110, 230, 231, 345, DIG. 11

[56] References Cited

U.S. PATENT DOCUMENTS 3,510,140  5/1970  Hermann ................. 277/207 A
4,299,399  11/1981 Haaland ................. 277/207 A
4,410,185  10/1983 Sporre ................... 277/207 A X

FOREIGN PATENT DOCUMENTS 530016   7/1931  Fed. Rep. of Germany ... 277/207 A
1939779  9/1970  Fed. Rep. of Germany ... 277/207 A
7800282  11/1978 Sweden .
1260263  1/1972  United Kingdom ........... 285/110

*Primary Examiner*—Allan N. Shoap
*Attorney, Agent, or Firm*—Jeffers, Hoffman & Niewyk

[57] ABSTRACT

A sealing ring for sealing the space between two substantially coaxial sealing surfaces which are axially insertable one in the other to a jointed position, especially for sealing the annular space between socket and spigot end of a pipe joint, comprises a first sealing portion (2) and a second sealing portion (4). The sealing portions are adapted at the axial insertion movement substantially stationary to engage one surface each of said sealing surfaces and to slide against each other. The first and the second sealing portion are by means of a releasable and/or substantially expensible connector portion (6) connected with each other at least at the front side of the sealing ring in respect of the direction of insertion movement of the second sealing surface during the jointing of the sealing surfaces.

10 Claims, 7 Drawing Sheets

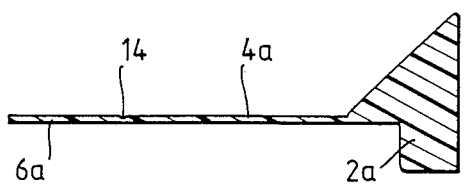
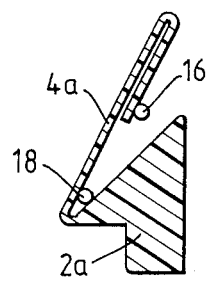
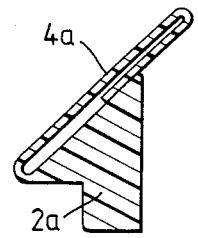
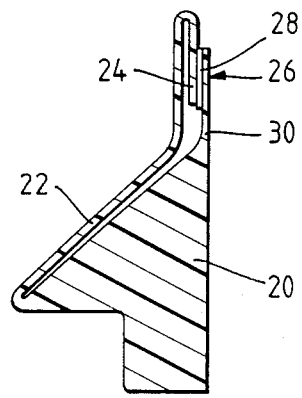

SEALING RING FOR A PIPE JOINT

The present invention relates to a sealing ring for sealing a space between two substantially coaxial sealing surfaces which are insertable one in the other, especially a sealing ring for sealing the annular space between a socket and a spigot of a pipe joint.

Many different types of sealing rings for sealing the annular space between a socket and a spigot of a pipe joint are previously known. The prior art sealing rings are of two main types, rolling rings and sliding rings. When providing a pipe joint by means of these types of sealing rings the sealing ring is positioned on one of the sealing surfaces and the sealing ring is compressed between this sealing surface and the other sealing surface while the sealing surfaces are axially inserted one in the other. The compression of the sealing ring thereby obtained provides for the tightness of the pipe joint.

The present invention relates to a sealing ring of the sliding type. When using this type of sealing ring the engagement of the sealing ring with the other sealing surface during the axial displacement of the sealing surfaces in relation to each other takes place either while the other sealing surface is sliding in relation to the sealing ring, so called outer sliding, or while there is a substantially stationary engagement between the other sealing surface and a portion of the sealing ring, a sliding taking place between two sliding surfaces inside the sealing ring, so called inner sliding. In order to provide a sliding without too great frictional resistance it is required that the surfaces along which the sliding takes place are provided with a lubricant. In connection with sealing rings acting with outer sliding it is a drawback that the lubricant has to be applied to at least one of the surfaces which shall slide along each other at the site where the pipes shall be jointed which is a dirty and in connection with large pipes of the well ring type also is a risky work. In connection with sealing rings acting with inner sliding, the sliding takes place only inside the sealing ring. In a sealing ring of the inner sliding type according to the Swedish patent No. 7800282-1 the sliding surfaces of the sealing ring are protected from dirt in such a way that it is possible to deliver the sealing rings to the working site where the rings are to be used with completely protected sliding surfaces provided with lubricant. Thus, sliding rings of this type comprise two portions connected with each other which during the insertion of the sealing surfaces one in the other substantially undisplaceably engage one sealing surface each and slide against each other along inner sliding surfaces. The two portions of the sealing ring may be connected with each other at different places of the ring. Thus, the portions may be connected with each other at one or the other side of the sealing ring or can be connected with each other at both sides thereof. In the case that the portions of the sealing ring are connected with each other at both sides of the sealing ring or at the side of the sealing ring which after the positioning of the sealing ring on one of the sealing surfaces is positioned at the front side of the sealing ring with regard to the direction of displacement of the other sealing surface when the sealing surfaces are being inserted one in the other there is a restriction of the length of the axial movement of the sealing surfaces which can be conducted after the other sealing surface has initiated its engagement with the sealing ring. Thus, the other sealing portion of the sealing ring, i.e. the sealing portion which is engaged by the other sealing surface during the axial movement of the sealing surfaces, can be displaced only so far that the place of connection between the portions of the sealing ring remains uneffected. When conducting a jointing movement which is longer that the distance which can be adopted by the other sealing portion of the sealing ring, i.e. a movement which causes an influence on the connection place between the portions of the sealing ring, the other sealing portion will bring with it the first sealing portion from its correct position on the first sealing surface. This provides for an incorrect position of the sealing ring in the pipe joint in turn providing that it is not possible to complete the jointing of the sealing surfaces, that the joint will be leaky and/or that the pipe socket is broken. In order to make sure that the function of a sealing ring of this kind is correct it is therefore necessary to manufacture the sealing ring with a second sealing portion of such a great length that it does not bring the first sealing portion with it even if the other sealing surface, as may occur in an eccentric assembling of the pipe, contacts the other sealing portion at a very early stage at any place of the periphery of the sealing ring. The increased size of the other sealing portion for making sure that the correct function of the sealing ring is maintained brings about increased material costs and is therefore inadvantageous especially with regard to the fact that it is on every occasion only at a small portion of the length of the sealing ring that the great length of the other sealing portion is necessary.

The object of the present invention is to provide a sealing ring of the type operating with inner sliding in which the above drawbacks do not occur.

In order to comply with this object the first and the second sealing portions are at least at the front side of the sealing ring in respect of the direction of movement of the second sealing surface during the insertion of the sealing surfaces one in the other connected with each other by means of a releasable and/or in a substantial degree extensible connector portion.

Thus, in the sealing ring according to the invention said connector portion provides that the second sealing portion will not displace the first sealing portion which is positioned on the first sealing surface from the correct position thereof even if the second sealing portion has insufficient length for satisfying the necessary sliding distance at any place of the periphery of the ring.

In a preferred embodiment of the sealing ring according to the invention the connector portion is constituted by an edge portion unitary with the second sealing portion, said edge portion being by means of a releasable adhesive joint connected with the first sealing portion. Thereby, the first sealing portion may be provided with a projecting flap which is provided with ridges and with which the connector portion of the second sealing portion is releasably connected.

Optionally the two portions of the sealing ring may be connected with each other or lack such connection at the side of the sealing ring opposite from the releasable connector portion.

In a modified embodiment of the sealing ring according to the invention the releasable connector portion is constituted by an indication of fracture in the connection between the first and the second sealing portions. It is possible to comply with the object of the invention also by means of a connector portion which is thin and extensible in such a way that it is easily extended to substantially increased length without subjecting the first sealing portion to such forces that have any influence thereon or prevent the jointing movement.

In an embodiment of the sealing ring in which the portions of the ring are connected with each other at both sides of the sealing ring and there is in the sealing ring defined a closed space the sealing ring according to the invention is advantageous also in the respect that the releasable joint is broken when the jointing movement is started if air is entrapped in the closed space so that such air can escape to the environment without preventing or obstructing the jointing movement.

In a preferred embodiment of the invention the second sealing portion is constituted by a thin sliding skin and it is thereby suitable to provide the sliding skin with material reductions in the form of grooves constituting folding indications in the sliding skin providing for a more close connection between the sliding surfaces of the sealing portions of the sealing ring.

The invention is described in the following with reference to the accompanying drawings.

FIGS. 4a, 4b and 4c show the manufacturing of the embodiment of a sealing ring according to the invention as shown in FIG. 3.

FIG. 5 is a section corresponding to FIGS. 2 and 3 of a further modified embodiment of the sealing ring according to the invention.

Figure 1:
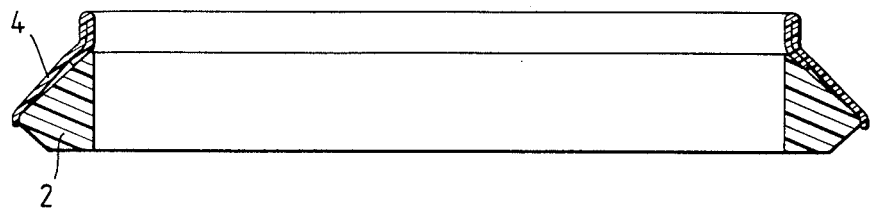
FIG. 1 is an axial section of a first embodiment of a sealing ring according to the invention.

The sealing ring shown in axial section in FIG. 1 is constituted by a sealing ring for sealing the space between the spigot end and the socket of two pipes, preferably two concrete pipes. The sealing ring is intended to be compressed between two sealing surfaces of a pipe joint in order to close and seal the space between the sealing surfaces. The pipe joint is constituted by connecting the two coaxial sealing surfaces with each other by axially inserting the inner sealing surface in the outer sealing surface, the inner sealing surface being positioned on the outer surface of the spigot end and the outer sealing surface being positioned on the inner side of the socket, the sealing ring being positioned on the sealing surface of the spigot end before the spigot end is inserted in the socket. A sealing ring according to FIG. 1, the section of which is shown on an enlarged scale in FIG. 2, consists of elastic material and comprises a first sealing portion 2 constituting the main portion of the sealing ring and a second sealing portion 4 constituting a relatively thin skin. The skin 4 has a connector portion 6 unitary with the skin and connected with the main position 2 at the upper side of the main portion in the figure. The main portion 2 has a conical sliding surface 8, and the skin 4 extends from the connector portion 6 upwards to a folding line and from the folding line downwards along the conical sliding surface 8 which is completely covered by the skin 4. The skin 4 forms at its inner surface a sliding surface 10 which is adapted to slide along the conical sliding surface 8 of the main portion 2 when the socket and the spigot end are being jointed. In order to facilitate the sliding movement between the sliding surfaces 8 and 10 a lubricant is positioned in the pocket defined by the sliding surfaces.

In accordance with the invention the sealing ring is provided with a connector means wherein connector portion 6 of the skin 4 is connected with the main portion 2 in a releasable way, i.e. in such a way that it is possible to release the skin 4 from the main portion in the area of the connector portion 6 by pulling the skin 4. The releasable connection of the connector portion 6 with the main portion 2 can be provided in numerous different ways within the scope of the invention. Thus, it is possible to provide the connection by means of an adhesive having a strength which is adjusted so that the adhesive connection is broken when a tensioning force is applied to the skin 4. As an alternative the connection portion may be spotwise connected with the main portion 2, and a further alternative is that the skin is at the connector portion 6 releasably vulcanized to the main portion 2 without the use of an adhesive.

Figure 2:
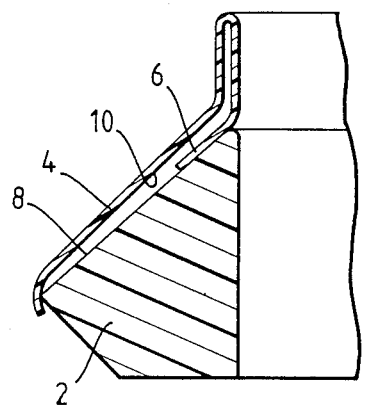
FIG. 2 shows the section of the sealing ring of FIG. 1 on an enlarged scale.
Figure 3:
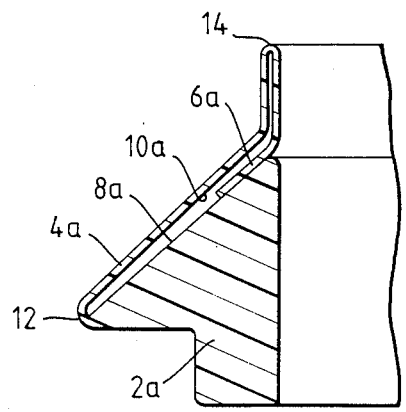
FIG. 3 is a section corresponding to FIG. 2 of a second embodiment of a sealing ring according to the invention.

FIG. 3 shows a section corresponding to FIG. 2 of a modified embodiment of the sealing ring according to the invention. As the sealing ring according to FIG. 2 the sealing ring according to FIG. 3 comprises a main portion 2, a skin 4 having a connector portion 6a, a conical sliding surface 8a on the main portion 2a and a sliding surface 10a on the skin 4a. The connector portion 6a is connected with the main portion 2a according to any of the methods described with reference to FIG. 2.

The embodiment according to FIG. 3 differs from the embodiment according to FIG. 2 in the respect that the skin 4a is connected with the main portion 2a not only at the connector portion 6a but also at the opposite edge 12 of the skin 4a.

In the embodiment of the sealing ring according to the invention shown in FIG. 3 the skin 4a has a folding indication 14 at its upper, folded edge portion providing that the skin forms a sharper fold at its upper edge in turn providing for a better connection of the portions of the skin engaging each other and with the conical sliding surface 8a of the main portion 2a. This close connection of the skin 4a provides that the sealing ring is more easy to handle and reduces the risk of air inclusions in the space defined by the sliding surfaces 8a and 10a.

FIGS. 4a, b and c illustrate the manufacturing of the embodiment of a sealing ring the section of which is shown in FIG. 3. In FIG. 4a the section of the sealing ring is shown in the position of the sealing ring after the manufacturing of the elastomeric material of the ring. The elastomeric material of the ring may be manufactured by extruding the profile of the ring, cutting the extruded profile to suitable length and glueing the ends together to form the ring or by direct compression moulding or injection moulding the ring in annular shape. In the manufacturing the skin 4a is formed connected with the main portion 2a at the edge 12 and is provided with the above folding indication 14 in the form of a groove. After that the skin is folded at the folding indication 14 and is as a whole folded towards the main portion 2a of the sealing ring to the position shown in FIG. 4b. A bead 16 of adhesive is applied to the connector portion 6a of the skin 4a, and a bead 18 of lubricant is applied in the pocket between the sliding surface 8a of the main portion 2a and the sliding surface 10a of the skin 4a. Finally the skin 4a is pressed against the main portion 2a to the position shown in FIG. 4c, wherein the adhesive bead 16 has been flattened to form an adhesive joint between the connector portion 6a and the opposite portion of the main portion 2a and the lubricant bead 18 has been distributed in the space defined by the sliding surfaces 8a and 10a. In the position shown in FIG. 4c the sealing ring is ready to be used for sealing a pipe joint.

The embodiment of the sealing ring according to the invention the section of which is shown in FIG. 5 consists like the previously described embodiments of elastic material and comprises a main portion 20 and a relatively thin skin 22. At its lower edge the skin 22 is manufactured unitary with the main portion 20 and at its opposite, upper edge the skin has a connector portion 24 The connector portion 24 is connected with a flap 26 projecting from the upper end of the main portion 20. The flap 26 has an upper, thicker portion 28 provided with ridges and a thinner portion 30 positioned between the portion 28 and the main portion. The skin 22 is at its connector portion 24 releasably adheared to the upper portion 28 of the flap 26, which is provided with ridges. The ridges facilitate the releasing of the connector portion 24 from the main portion 20 in the case that the sliding surface turns out to be of insufficient length when the sealing surfaces are jointed by being inserted one in the other.

The thin portion 30 of the flap 26 can be extended to the double length while the jointing movement takes place providing for a further security so as to obtain without problems the necessary sliding length. The thin portion 30 is also adapted to break as a consequence of a certain elongation so that the sealing ring can provide its sliding function substantially independent of the length of the sliding distance.

Figure 6A:
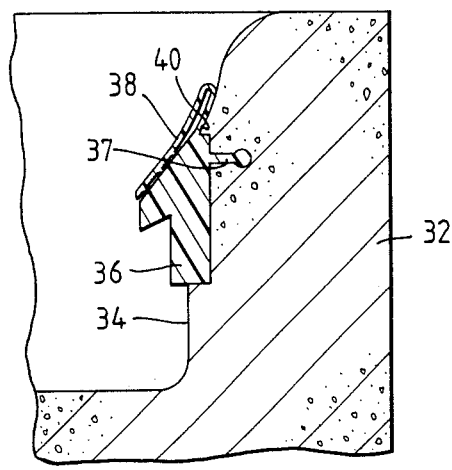
FIG. 6a is a section of a further modified embodiment of a sealing ring according to the invention.
Figure 6B:
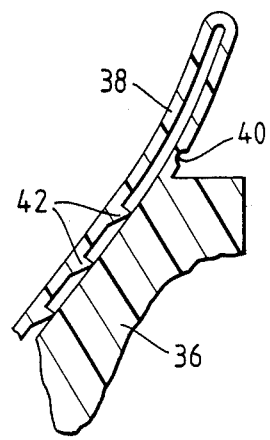
FIG. 6b shows a detail of the sealing ring of FIG. 6a on an enlarged scale.

In FIG. 6a there is shown the section of a sealing ring according to the invention which is fastened in a concrete pipe socket 32 at the inner sealing surface 34 thereof. The sealing ring comprises a main portion 36 having a fastening portion 37 moulded into the concrete material of the socket 32. The sealing ring has a skin 38 unitary with the main portion 36, the skin having at the upper connection with the main portion 36 a connector portion 40 the design of which more clearly appears from FIG. 6b. Thus, the connector portion 40 consists of a section of the skin 38 having reduced thickness and forming an indication of rupture at which the skin 38 is broken in the case that the jointing movement is of such length that it can not be taken up by the skin 38 per se. In the embodiment of the sealing ring according to the invention shown in FIGS. 6a and 6b the skin 38 is at its inner surface which forms the sliding surface of the skin provided with hook shaped projections adapted to prevent or at least obstruct an axial separation of the sealing surfaces after the jointing.

Figure 7A:
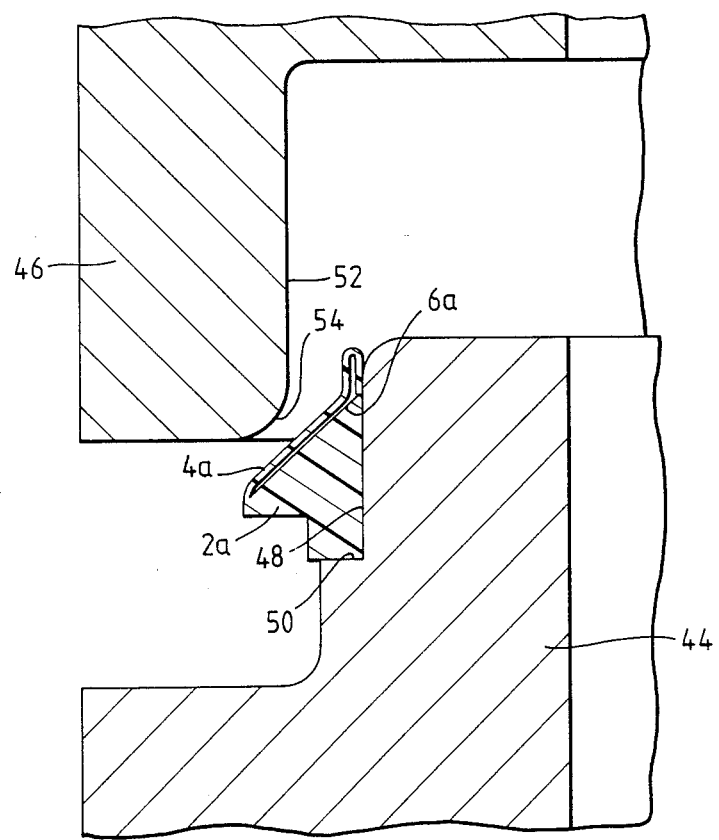
FIGS. 7a, 7b and 7c are sections of the wall of a spigot end and a socket of two pipes and a sealing ring according to the invention, the figures showing the jointing of the spigot and the socket for establishing the pipe joint.

FIGS. 7a, b and c illustrate the jointing operation in providing a pipe joint by means of a sealing ring according to the invention of the type shown in FIG. 3. In FIG. 7a there is shown a section of the wall of a spigot end 44 and a socket 46 of two well rings which shall be sealingly connected with each other by means of a sealing ring according to the invention. The sealing ring is tensioned onto the spigot end 44 with the main portion 2a engaging a sealing surface 48 thereof, the main portion 2a engaging at its lower surface 48 a shoulder 50 provided on the spigot end. The joint is established by lowering the well ring provided with the socket 46 downwards upon the spigot end 44 to a position in which the sealing ring is compressed between the sealing surface 48 of the spigot end and a sealing surface 52 of the socket 46.

When the upper well ring is lowered the corner 54 of the socket 46 meets with the skin 4a of the sealing ring, the skin 4a being moved together with the sealing surface 52 of the socket during the continued jointing movement while a sliding movement takes place inside the sealing ring as a sliding between the sliding surface 10a of the skin 4a and the sliding surface 8a of the main portion 2a. Thus, the main portion 2a is during the jointing movement substantially indisplaceably fixed in relation to the sealing surface 48 of the spigot end 44 and the skin 4a is substantially indisplaceably fixed in relation to to the sealing surface 52 of the socket 46.

Figure 7B:
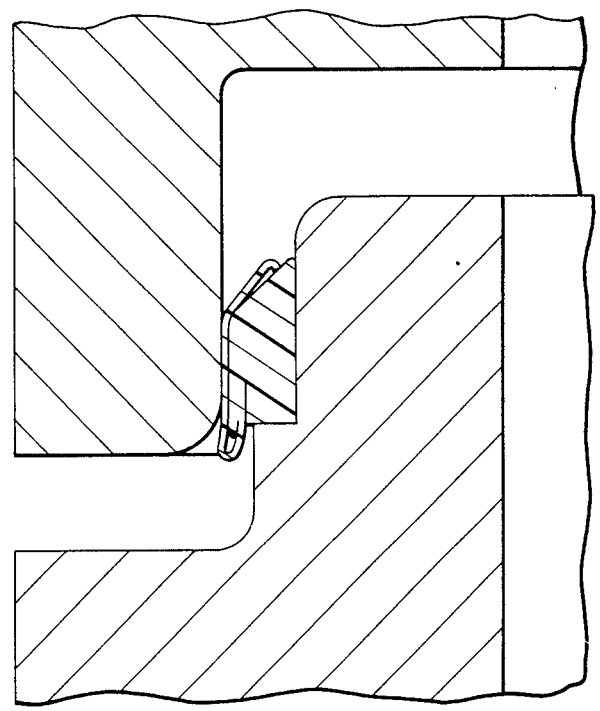

At the stage of the jointing operation shown in FIG. 7b the excess material of the skin 4a, that is the portion of the skin positioned above the connector portion 6a of the skin, has so to say been consumed. In a sealing ring of the previously known type in which the skin 4a is at the upper side of the sealing ring firmly connected with the main portion 2a, a continued jointing movement past the position shown in FIG. 7b would have an influence on the upper portion of the main portion 2a providing an incorrect positioning of the sealing ring in the pipe joint in turn causing that the jointing operation cannot be completed and/or that the joint will be leaky.

Figure 7C:
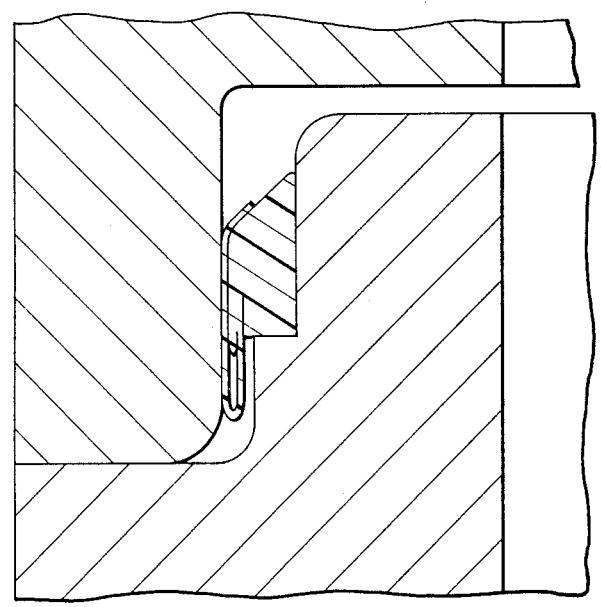

As appears from FIG. 7c the connector portion 6a of the sealing ring according to the invention makes it possible to complete the jointing operation without affecting the position of the sealing ring in the joint in such a way that the tightness of the joint is jeopardized. As appears from FIG. 7c the connector portion has at this stage been released from the main portion 2a and has uncovered the upper portion of the conical sliding surface 8a of the main portion 2a.

It is realized that the jointing operation shown in FIGS. 7a, b and c illustrate an ideal coaxial position between the spigot end 44 and the socket 46 and that a perfect coaxial position does in practice not appear during the jointing operation. In practice the socket 46 takes a more or less excentric position in relation to the spigot end 44 when the jointing operation is initiated which means that the corner 54 of the socket 46 will engage the skin 4a of the sealing ring at different points in the radial direction. This means that the necessary length of the skin 4a may be either greater or less than in the ideal case. This emphasizes even more the importance of the invention, as a sealing ring of the type operating with inner sliding in absence of the releasable connector portion according to the invention must have a great excess length of the skin in order to make sure that the length of the skin 4a is sufficient around the whole periphery of the sealing ring when the pipe joint is being mounted.

The releasable connection of the skin 4a by means of the connector portion 6a also allows that air enclosed in the space defined by the sliding surfaces 8a and 10a can escape to the environment as a consequence of the broken connection when the pressure in the space is increased as a consequence of the jointing of the sealing surfaces 48 and 52. Enclosed air might prevent the jointing of the sealing surfaces if it does not have the possibility of escaping from the space in question.

The invention can be modified within the scope of the following claims.

We claim:

1. A sealing ring for sealing a space between two substantially coaxial first and second sealing surfaces which are jointable by being axially inserted one in the other, the sealing ring being adapted in advance of the jointing of the sealing surfaces to be positioned in connection with one of the sealing surfaces, said sealing ring comprising: a first sealing portion of the sealing ring adapted to be in substantially undisplaceable engagement with said first sealing surface; a second sealing portion which is adapted at the axial insertion of the sealing surfaces one in the other to engage with and to be displaced by the second sealing surface while sliding in relation to said first sealing portion, said second sealing portion comprising a skin-like portion being much thinner than said first sealing portion in the radial dimension of said first sealing portion, said skin-like second sealing portion forming with the first sealing portion a lubricant pocket; a lubricant contained in the lubricant pocket; and a releasable connector means for releasably connecting said second sealing portion to said first sealing portion at a side of said sealing ring facing generally toward the second sealing surface at the axial insertion of the sealing surfaces one in the other such that said second sealing portion detaches from said first sealing portion when the second sealing portion is pushed rearwardly beyond a given axial limit by engagement with the second sealing surface, said connector means comprising an edge portion of said second sealing portion being connected with said first sealing portion by means of a releasable adhesive joint.

2. A sealing ring as claimed in claim 1, characterized in that said edge portion is unitary with the second sealing portion.

3. A sealing ring as claimed in claim 2, characterized in that said edge portion is connected with a flap projecting from said first sealing portion.

4. A sealing ring as claimed in claim 3, characterized in that the edge portion is connected with a portion of the flap which is provided with ridges and that the flap comprises a portion which is extensible to at least its double length.

5. A sealing ring as claimed in claim 1, characterized in that the sealing portions comprise sliding surfaces adapted to slide against each other in a given direction of movement during the axial insertion of the sealing surfaces one in the other and that at least one of the sliding surfaces comprises projections adapted to obstruct movement of the sealing surfaces in a direction opposite to said direction of the movement.

6. A sealing ring for sealing a space between two substantially coaxial first and second sealing surfaces which are jointable by being axially inserted one in the other, the sealing ring being adapted in advance of the jointing of the sealing surfaces to be positioned in connection with one of the sealing surfaces, said sealing ring comprising: a first sealing portion of the sealing ring adapted to be in substantially undisplaceable engagement with said first sealing surface; a second sealing portion which is adapted at the axial insertion of the sealing surfaces one in the other to engage with and to be displaced by the second sealing surface while sliding in relation to said first sealing portion, said second sealing portion comprising a skin-like portion being much thinner than said first sealing portion in the radial dimension of said first sealing portion, said skin-like second sealing portion forming with the first sealing portion a lubricant pocket; a lubricant contained in the lubricant pocket; and an extensible connector portion for connecting said second sealing portion to said first sealing portion at a side of said sealing ring facing generally toward the second sealing surface at the axial insertion of the sealing surfaces one in the other, said connector portion comprising means whereby the connector portion can stretch and extend in length in a generally axial direction when the second sealing portion is pushed rearwardly beyond a given axial limit by engagement with the second sealing surface, said connector means comprising an edge portion of said second sealing portion being connected with said first sealing portion by means of a releasable adhesive joint.

7. The sealing ring of claim 6, characterized in that said edge portion is unitary with the second sealing portion.

8. A sealing ring as claimed in claim 7, characterized in that said edge portion is connected with a flap projecting from said first sealing portion.

9. A sealing ring for sealing a space between two substantially coaxial first and second sealing surfaces which are jointable by being axially inserted one in the other, the sealing ring being adapted in advance of the jointing of the sealing surfaces to be positioned in connection with one of the sealing surfaces, said sealing ring comprising: a first sealing portion of the sealing ring adapted to be in substantially undisplaceable engagement with said first sealing surface; a second sealing portion which is adapted at the axial insertion of the sealing surfaces one in the other to engage with and to be displaced by the second sealing surface while sliding in relation to said first sealing portion, said second sealing portion comprising a skin-like portion being much thinner than said first sealing portion in the radial dimension of said first sealing portion, said skin-like second sealing portion forming with the first sealing portion a lubricant pocket; a lubricant contained in the lubricant pocket; and a releasable connector means for releasably connecting said second sealing portion to said first sealing portion at a side of said sealing ring facing generally toward the second sealing surface at the axial insertion of the sealing surfaces one in the other such that said second sealing portion detaches from said first sealing portion when the second sealing portion is pushed rearwardly beyond a given axial limit by engagement with the second sealing surface, said skin-like second sealing portion comprising means facilitating folding in the form of a groove in the material of the skin-like second sealing portion.

10. A sealing ring as claimed in claim 9 characterized in that the sealing portions comprise sliding surfaces adapted to slide against each other in a given direction of movement during the axial insertion of the sealing surfaces one in the other and that at least one of the sliding surfaces comprises projections adapted to obstruct movement of the sealing surfaces in a direction opposite to said direction of the movement.

* * * * *